Dec. 19, 1967 P. KOLLSMAN 3,359,194
METHOD OF AND APPARATUS FOR PRODUCING A
DEIONIZED LIQUID PRODUCT BY
ELECTRODIALYSIS
Filed Nov. 23, 1966 3 Sheets-Sheet 1

INVENTOR.
Paul Kollsman
BY Howard G. Russell
his ATTORNEY

Dec. 19, 1967  P. KOLLSMAN  3,359,194
METHOD OF AND APPARATUS FOR PRODUCING A
DEIONIZED LIQUID PRODUCT BY
ELECTRODIALYSIS

Filed Nov. 23, 1966

INVENTOR.
Pauls Kollsman
BY Howard G. Russell
his ATTORNEY

Dec. 19, 1967

P. KOLLSMAN 3,359,194

METHOD OF AND APPARATUS FOR PRODUCING A
DEIONIZED LIQUID PRODUCT BY
ELECTRODIALYSIS

Filed Nov. 23, 1966

INVENTOR.
Paul Kollsman
BY
Howard G. Russell
his ATTORNEY

United States Patent Office 3,359,194
Patented Dec. 19, 1967

3,359,194
METHOD OF AND APPARATUS FOR PRODUCING A DEIONIZED LIQUID PRODUCT BY ELECTRODIALYSIS
Paul Koilsman, 100 E. 50th St., New York, N.Y. 10022
Filed Nov. 23, 1966, Ser. No. 596,532
18 Claims. (Cl. 204—180)

ABSTRACT OF THE DISCLOSURE

The present improvements are directed to the production of a deionized product liquid by moving ions of one polarity, under the influence of an electrical potential, first through a so-called filter membrane, through which the ions pass with relatively large accompanying "solvent shells," into a product space and thence through a membrane of ion exchange material, through which the ions pass with relatively small "solvent shells," resulting in an accumulation of solvent, or deionized product, between the two membranes. Hydrostatic pressure is applied to the influent liquid, and passage of ions of the opposite polarity through the filter membrane into the product is restricted by application of a sufficiently high electrical potential.

---

This application is a continuation-in-part of my copending application Ser. No. 187,700 filed Apr. 16, 1962, now abandoned.

This invention relates to the art of electrodialysis, and is more particularly concerned with the production of deionized liquid products, and apparatus for carrying out the proposed method.

According to the conventional procedure of producing a deionized liquid product by electrodialysis the raw liquid which is to be treated is placed in a so-called deionization compartment of an electrodialysis cell bordered by two membranes, at least one, or both, of which is selectively ion permeable. A direct electrical potential is then applied across the liquid and the membranes, as a result of which negative anions move through one membrane towards the positive anode and positive cations move in the opposite direction through the other membrane towards the negative cathode. The bordering membranes permit the emigrating ions to pass, but prevent ions of the opposite polarity from immigrating into the deionization compartment. The migration of ions results in a flow of an electric current through the cell.

My copending application Ser. No. 187,747, filing date Apr. 16, 1962, now U.S. 3,309,301, employs a different approach. In principle, the solvent component of an electrolyte is moved from a raw liquid chamber through a membrane into a product chamber by the movement of ions.

The same ions are then moved out of the product chamber through a second membrane through which the ions pass accompanied by only a relatively small volume of solvent by reason of a higher ionic concentration prevailing in the pore liquid of the latter membrane.

As a result of the difference in solvent transport through the two membranes more solvent is transported into the product space than out of it, solvent liquid accumulates in the space and may then be withdrawn as product.

As the product liquid passes through a membrane whose pore size may be selected to be sufficiently small to filter out undesirable constituents of the raw liquid, such as bacteria—regardless of whether such constituents are ionic or nonionic—a deionized product of high purity is obtainable.

Maximum purity, according to the teachings of my aforesaid copending application, is obtained under a condition in which a lesser hydrostatic pressure prevails in the raw liquid chamber than in the product chamber which is separated from the raw liquid chamber by a filter membrane. This arrangement precludes any accidental hydraulic leakage of raw liquid into the product space as solvent only moves as a result of ion movement.

The quality of commercially available filter membranes of cellulosic material, cellulose derivatives, or synthetic plastics, has reached a high level, and the manufacturers of such filter membranes are able to control the porosity within close tolerances. The uniformity of the filter membrane structure minimizes the danger of hydraulic leakage.

The present invention and improvement is based on the discovery that application of a higher hydrostatic pressure to the raw liquid increases the rate of production of product liquid at a disproportionate degree. It is considerably higher than the transfer of liquid through the filter membrane which occurs as a result of the hydraulic pressure on the membrane while no electric potential is applied.

A typical example illustrates the increase. In an experimental three chamber apparatus a certain hydrostatic overpressure was first applied to the raw liquid which produced a hydraulic transfer of liquid through the membrane of 11 volumetric units within a given period of time under a condition of zero electric current and zero potential.

The apparatus was next operated under conditions of substantially equal hydraulic pressure on opposite sides of the filter membrane and just enough pressure differential (3 mm. water column) to urge both membranes into contact. Application of a certain voltage resulted in a production of 5.1 volumetric units of deionized liquid in the product chamber by transfer through the filter membrane. A certain electric current flowed through the cell and a product of a certain resistivity was produced. The raw liquid pressure on the filter membrane was then increased from 3 mm. to 500 mm. water column resulting in a fivefold product increase accompanied by a decrease in the product resistivity by only 30 percent, as compared to operation without a substantial pressure differential. This small sacrifice in the degree of deionization was quite out of proportion to the fivefold increase in productivity.

While the causes underlying the disproportionate increase in output have not been ascertained with certainty because of the difficulty of determining what occurs in the pores of the filter membrane, the results are definite, certain and reproducible.

In this connection it is known to employ a three-chamber electrodialysis cell comprising a filter membrane and a cation membrane for the production of sodium hydroxide and a mixture of sodium hydroxide and sodium chloride from highly concentrated sodium chloride solution which is forced, by hydrostatic pressure, to pass through the filter membrane into a central chamber in the direction towards the cathode. In the known device and process anions are transferred with the hydraulic flow into the intermediate chamber against the pull of the anode.

Entirely different results are produced by the present invention and method which produces a highly deionized product by preventing the passage of substantially all of the anions out of the anode chamber through the filter membrane by application of a relatively high potential, sufficient to retain substantially all the anions in the anode chamber.

The same principle applies to the retention of cations in the cathode chamber in case a filter membrane is paired with an anion membrane.

The sufficiency of the potential is readily ascertained by testing the product for resistivity.

The degree of deionization increases for increased potential, but curiously the volume of the product also increases, which runs counter to the expectation that higher volume production would be accompanied by a somewhat lower degree of deionization.

The invention thus is particularly suited for the production of relatively large volumes of product at relatively low electric energy input.

The various objects, features and advantages of this invention will appear more fully from the detailed description which follows accompanied by drawings showing, for the purpose of illustration, different forms of apparatus for practicing the invention. The invention also resides in certain new and original features of construction and combination of elements, as well as steps and sequences of steps hereinafter set forth and claimed.

Although the characteristic features of the invention which are believed to be novel will be particularly pointed out in the claims appended hereto, the invention itself, its objects and advantages, and manners in which it may be carried out may be better understood by referring to the following description taken in connection with the accompanying drawings forming a part of it in which:

Figure 1:
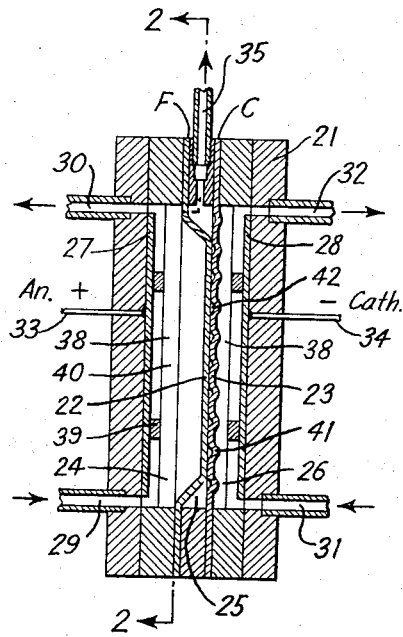
FIG. 1 is a vertical cross section through a three-compartment cell for practicing the invention.
Figure 2:
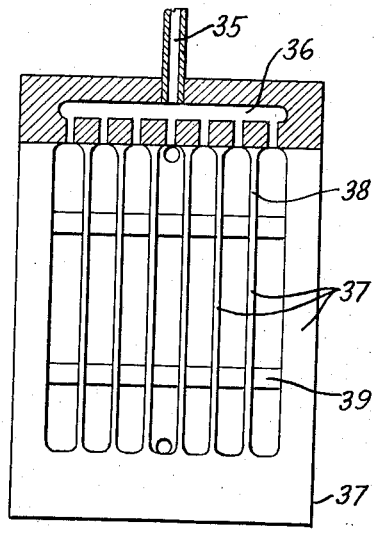
FIG. 2 is a section on line 2—2 of FIG. 1.

In the following description and in the claims various details will be identified by specific names for convenience. The names, however, are intended to be generic in their application. Corresponding reference characters refer to corresponding parts in the several figures of the drawings.

The drawings accompanying, and forming part of, this specification disclose certain specific details of construction of the invention for the purpose of explanation of the broader aspects of the invention, but it is understood that structural details may be modified in various respects without departure from the principles of the invention and that the invention may be incorporated in other structural forms than shown.

The apparatus shown in FIG. 1 comprises a housing generally designated as 21 subdivided by membranes 22 and 23 into three chambers 24, 25 and 26. Electrodes 27 and 28 are mounted in the chambers 24 and 26. Inflow and outflow ducts 29, 30 and 31, 32, respectively, lead to and from the electrode chambers. Leads 33 and 34 extend to a suitable source of electric direct current (not shown). The intermediate or product chamber 25 has an outflow duct 35 manifolded by means of a manifold 36 so as to withdraw product liquid evenly from the top of the product chamber.

A membrane spacer or support 37 in the chamber 26 comprises vertical ribs 38 and transverse ribs 39. The spacer supports the membrane 23 if ever the force exerted on the membrane 23 from the left exceeds the force exerted on it from the right, the latter being a function of the liquid pressure in the chamber 26. A similar spacer or support 40 is shown in chamber 24 in which it supports the membrane 22.

Figure 4:
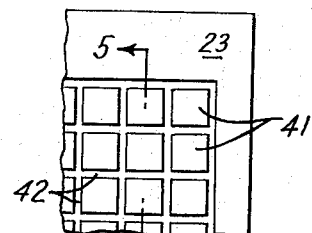
FIG. 4 is an elevational view of a portion of a contoured membrane used in the cell of FIG. 1.
Figure 5:
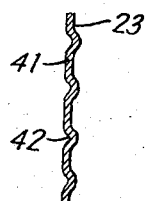
FIG. 5 is a section taken on line 5—5 in FIG. 4.

The membrane 22 is shown as being substantially flat surfaced, the membrane 23 is shown (FIG. 4) as having projecting portions 41 and recessed portions 42, at least on the side facing the membrane 22. If the membranes move into a position of contact, the recessed portions 42 form channels through which product liquid may escape from between the membranes to the outflow duct 35.

The membrane 23 is an ion selective membrane composed of ion exchange material. In the illustrated example the electrode 27 is connected to the positive pole of the source of electric power, hence is the anode. Electrode 28 is connected to the negative pole of the source of electric power and forms the cathode. The membrane polarity is such that cations pass from electrode to electrode, whereas entrance of anions into the product chamber 25 is restricted. Under such circumstances the membrane 23 must be a cation membrane, in other words, a membrane which is selectively permeable to cations and passage resistant to anions.

Good selectivity implies that the membrane pores are relatively small in order that the fixed electric charges in the membrane matrix may exert the proper control over ions in the pore liquid which, under the bias of the electrodes, seek to pass through the pore passages.

Good selectivity further implies a relatively high ionic concentration of the pore liquid. In other words, the number of cations per volumetric unit of liquid in the pores is relatively high. This may also be expressed in terms of ions-to-solvent-content ratio of the pore liquid, which is high.

By way of contrast the membrane 22 is of a material having larger pores. It may be called a filter membrane and its pore size is principally determined by the desired filtering function. If, for example, it is the object to produce highly purified water, the pore size of the membrane 22 is selected to prevent mechanical impurities and bacteria from passing therethrough.

Cations pass through the pores of the membrane 22 with a considerably larger solvent shell than the same ions when passing through the selective membrane 23. Thus, in effect, the cations passing into the central chamber import a larger volume of solvent than they export therefrom when passing through the ion selective membrane 23. The difference between the imported and exported solvent volume is product.

The membrane 22 may be treated to impart ion exchange properties to it, as will later be pointed out.

Figure 3:
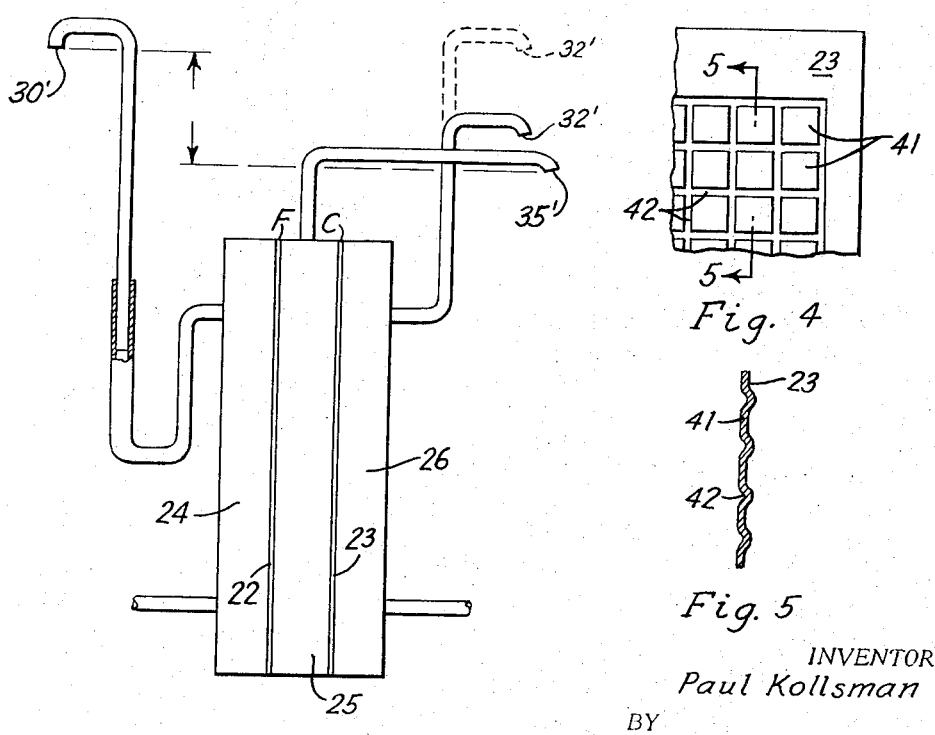
FIG. 3 is a simplified diagrammatic illustration of the cell of FIG. 1 and certain pressure conditions prevailing therein.

FIG. 3 illustrates the pressure conditions in the cell. The outflow 30' from the chamber 24 is at all times at a higher level than the outflow 35' from chamber 25. Thus hydrostatic pressure acts on the membrane 22 from the left. The outflow 30' from chamber 24 is shown adjustable to indicate that the pressure in chamber 24 may be varied in relation to the pressure in chamber 25.

Under these circumstances membrane 22 is flexed to the right into proximity of, or contact with, the membrane 23. The membrane 23 is mechanically supported on its right side by the support 37.

In operation, source liquid to be treated is passed through chamber 24 from which cations and accompanying solvent pass through the membrane 22 into the product chamber 25. The cations continue to move towards the cathode through the ion selective membrane 23, but when passing therethrough are accompanied by a smaller volume of solvent.

Solvent accumulates in the chamber 25, even builds up a hydrostatic pressure therein which tends to separate the contacting membranes 22, 23.

Chamber 26 contains a suitable electrolyte. Passage of anions in the opposite direction through the membrane 23 and into the product chamber is prevented by the anion passage resistance of the membrane 23, and passage of anions from the anode chamber through the membrane 22 is prevented by application of a sufficiently high potential to the electrodes.

Figure 6:
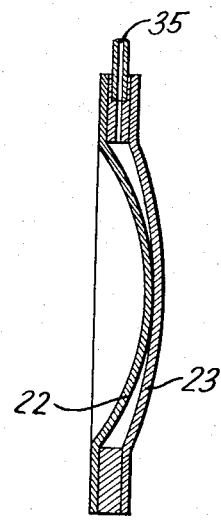
FIG. 6 illustrates an optional membrane arrangement of the cell of FIG. 1.

The membrane supports 37 may be dispensed with and the membranes be installed in drumtight condition stretched within, or over, a frame. Polyethylene membranes lend themselves well to such tightening. Under the hydrostatic pressure acting on membrane 22 the membranes then assume the position shown in FIG. 6.

Figure 7:
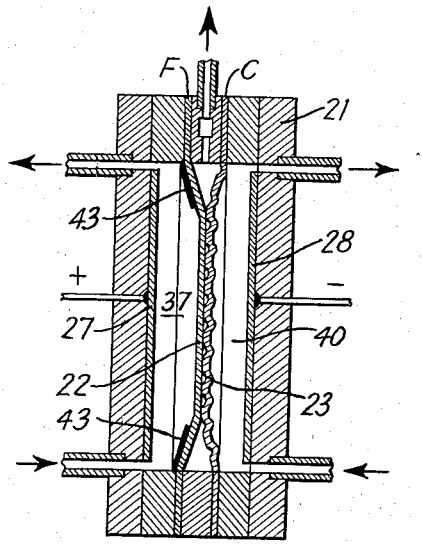
FIG. 7 is a plan view illustrating an optional application of insulation to certain portions of a membrane.

As shown in FIG. 7, the filter membrane 22 may be provided with a solution impermeable border zone 43 preferably wide enough to seal that border portion of the membrane which physically cannot flex into contact with the ion selective membrane. This is conveniently accomplished by applying a coat of lacquer to such area to seal the membrane pores.

Figure 9:
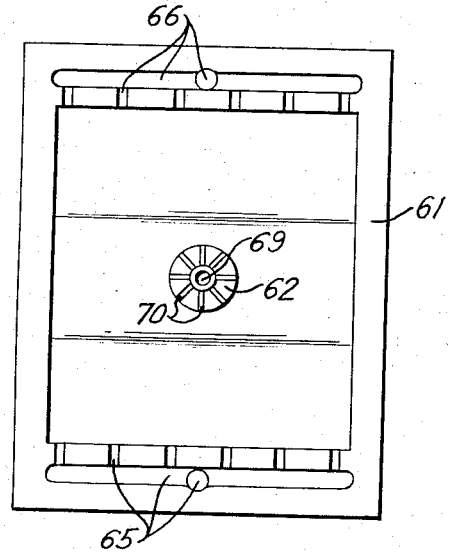
FIG. 9 is a section taken on line 9—9 in FIG. 8.
Figure 8:
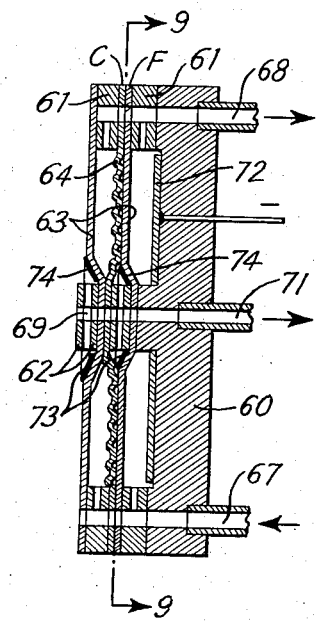
FIG. 8 is a vertical cross section through a portion of a preferred form of multicompartment cell.

FIGS. 8 and 9 illustrate a preferred form of multichamber cell. Only the right hand portion of the cell is shown, it being understood that the membrane arrangement is continued to the left to provide as many chambers as desired. The chambers terminate with an electrode chamber at the far end.

The cell is constructed of end portions, of which one is shown at 60, marginal or peripheral spacers 61, central or internal spacers 62, filter membranes 63 and cation membranes 64. The membranes are mounted in pairs between marginal spacers 61. Each pair of membranes is composed of a filter membrane 63 and a cation membrane 64 disposed face to face, as shown.

Central spacer disks 62 are placed between the membranes of each pair. As a result, membranes of adjacent pairs contact each other within the central portion of the cell.

The marginal or peripheral spacer has passages 65 and 66 formed therein which, in the assembled cell stack, form inflow and outflow passages 67, 68, respectively. The central or internal spacers 62 are provided with a central passage 69 from which radial passages 70 extend.

After assembly the membranes are perforated in line with the central passages 69 of the stacked disks 62 and a product passage 71 results through which product liquid is withdrawn from the product compartments 73 in which the spacers 62 lie.

Electrodes are provided in the terminal chambers, one such electrode being shown at 72.

In operation raw liquid enters the cell through inflow passage 67, flows through the compartments formed by the marginal spacers 61 and flows out through the passage 68. The membranes are of flexible material, for example the membranes 63 may be polyethylene filter membranes and the membranes 64 may be polyethylene-styrene copolymer cation membranes.

Preferably the border zone 74 of the filter membrane adjacent the central spacers is sealed to become liquid impermeable and electrically nonconductive. This is conveniently done by applying a coat of lacquer thereto.

Figure 10:
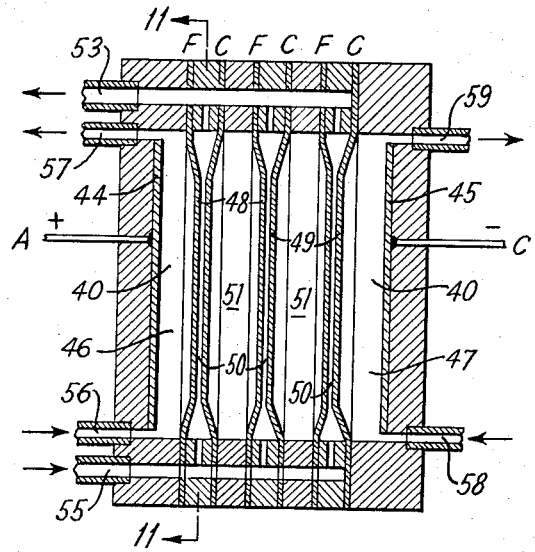
FIG. 10 is a vertical cross section through a reversible multicompartment cell for practicing the invention.

The multicell apparatus shown in FIG. 10 comprises electrodes 44, 45 in electrode chambers 46, 47. The space between the electrodes is subdivided into individual raw liquid and product chambers by filter membranes 48 and ion selective membranes 49.

Figure 11:
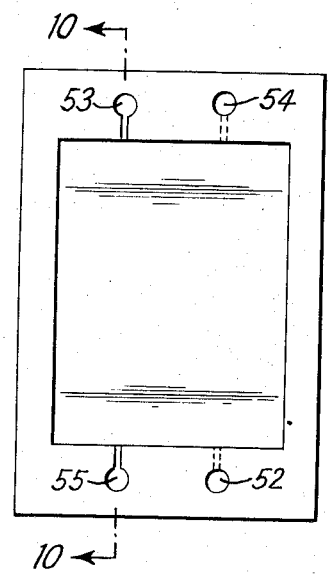
FIG. 11 is a section taken on line 11 in FIG. 10.

Assuming that the electrode 45 is the cathode and electrode 44 is the anode, and assuming that the membranes 49 are cation membranes, then chambers 50 become product chambers and chambers 51 are raw liquid chambers into which liquid to be purified, or concentrated, is introduced through an inflow duct system 52 (FIG. 11). Product liquid is withdrawn from the product chambers 50 through an outflow duct system 53. After extraction of solvent, raw liquid leaves the chambers 51 through an outflow duct system 54 (FIG. 11).

In order to make the apparatus of FIG. 10 reversible, a further inflow duct system 55 is provided for the chambers 50.

The electrode chambers 46 and 47 preferably contain a filler or spacer structure 40. The spacer may be similar in construction to the spacer 37 of FIG. 1 or may consist of open mesh material 76 (FIG. 12) such as Saran (polyvinyledene chloride) or nylon to prevent the endmost membranes from being flexed into contact with the electrodes 44 and 45.

The membranes 48 and 49 are of flexible material and are flexed into membrane-to-membrane proximity or contact within the product chambers by reason of the higher hydrostatic pressure prevailing in the raw liquid chambers.

Assuming the liquid to be treated is water, raw water enters through duct system 52 (FIG. 11) and leaves the chambers 51 at a somewhat higher ionic concentration through duct system 54. Product liquid is withdrawn through the duct system 53. Electrolyte, which may also be raw water, is passed through the electrode chambers by ducts 56, 57, 58, 59.

Anion membranes may be used in place of the cation membranes. In that case anions move the solvent, and each chamber having an anion membrane on the anode side becomes a product chamber.

The apparatus of FIG. 10 is particularly well suited for the treatment of liquids which tend to clog the membranes after a certain period of operation.

Clogged membranes may be freed by reversing the flow through the membranes. Thus raw liquid may be passed through chamber 50 by ducts 55, 53 and product liquid may be withdrawn from chambers 51 through ducts 54.

Under these conditions the membranes flex oppositely, the chambers 51 become narrow product chambers within which the membranes are in contact or near contact and the chambers 50 assume the dimension which chambers 51 had previous to the flow reversal.

Figure 12:
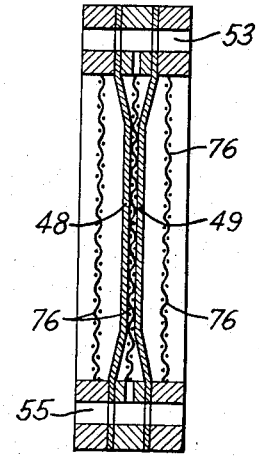
FIG. 12 illustrates a modified membrane arrangement for the cell of FIG. 10.

Membranes having smooth surfaces sometimes cling to each other which somewhat impedes the withdrawal of liquid from the product chambers. In order to avoid such clinging, a relatively thin and coarse mesh plastic spacer material 76 may be installed in each chamber as shown in FIG. 12.

The membranes used in practicing the invention are ion selective membranes and filter membranes. Experience with commercially available ion selective membranes indicates that cation membranes possess greater chemical stability than anion membranes. They are preferred for this reason. The ion selective membranes which are commercially available or which may be made by known procedures may be divided into those which are essentially rigid and others which possess a considerable degree of flexibility and resiliency.

The filter membranes may be essentially nonpolar, that is, ionically nonselective, or they may possess certain ion exchange characteristics.

The filter membranes differ from the ion selective membranes previously referred to in that the filter membranes are of considerably larger pore size, a property on which the practice of this invention depends.

Membranes

Tests were conducted with commercially available filter membranes and commercially available ion selective membranes.

*Filter membranes.*—The filter membranes may be divided into two groups, inherently hydrophilic filter membranes and inherently hydrophobic filter membranes. As will be shown, filter membranes may be treated to impart to them certain desirable characteristics, for example in order to make a hydrophobic membrane hydrophilic.

Many hydrophilic filter membrane materials are cellulose and cellulose derivatives. They are available in a wide range of pore sizes. Some membranes are reinforced by filaments, e.g., nylon, for greater physical strength.

"Ultraflex" filter membranes were tested in pore sizes ranging from less than 5 m$\mu$ (UA superdense) to 400 m$\mu$ (A coarse). The best results were obtained with membranes of the range between 100 m$\mu$ (UA coarse) and 250 m$\mu$ (A medium).

"Millipore" filter membranes were tested in pore sizes ranging from 10 m$\mu$ (VF) to 5 $\mu$ (SM), specific sizes being as follows: VF 10 m$\mu$; VM 50 m$\mu$; VC 100 m$\mu$; GS 220 m$\mu$; HA 450 m$\mu$; PH 300 m$\mu$; WH 450 m$\mu$ (nylon reinforced); WS 3 $\mu$ (nylon reinforced); SM 5$\mu$. The best results were obtained in the range of pore sizes from 100 m$\mu$ and 450 m$\mu$.

For the treatment of solutions containing organic solvents filter membranes are available made of materials which resist such solvents.

"Ultraflex" membranes were tested in a range of pore sizes from less than 5 m$\mu$ (UO superdense) to 400 m$\mu$ (O coarse). The best results were obtained with a membrane of 250 m$\mu$ pore size (O medium).

"Millipore" membranes are also available in a composition resisting organic solvents. The following were tested: OH 1.5 $\mu$; OS 10 $\mu$. These membranes consist of polyethylene. The OH membrane was found most satisfactory.

The membrane was also subjected to a chemical surface treatment to impart certain ion exchange properties to it resulting in a desirable reduction of its original hydrophobic behavior. Particulars of the treatment appear below among the examples.

Other synthetic filter membranes which were tested included a 10 m$\mu$ membrane known in the art as Graver "Hisep" membrane. It proved operative when paired with a selective membrane of less than 7 m$\mu$ pore size.

Method of making filter membranes and their composition are discussed in German Patents 805,039 and 913,646.

*Ion selective membranes* are commercially available in many different compositions. Their manufacture has been disclosed in the patent literature. Practically all of the presently commercially available ion selective membranes are of a pore size between 2 and 10 m$\mu$, the most commonly recurring pore size being between 6 and 7 m$\mu$.

Among the membranes tested were "Amfion" membranes C-60 and C-103 (cationic) and A-60 (anionic). These membranes are basically polyethylene/styrene copolymers sulfonated, or quarternized, as the case may be.

"Nepton" membrane CR-61 and AR 111-A. The CR-61 membrane material is a styrene divinyl benzene copolymer with sulfonic ion exchange groups thereon and is a cation exchange membrane (U.S. Patent 2,731,411). The AR 111-A membrane is a styrene divinyl benzene, vinyl pyridine anion exchange membrane (U.S. Patent 2,860,097).

Further membranes which were tested were composed of phenolsulfonic acid formaldehyde resin (U.S. Patent 2,636,851). These membranes were relatively rigid and somewhat brittle. They do not lend themselves to flexing.

Other ion selective membranes suited for practicing the invention are described in the 1957 issue of Symposium of Saline Water Conversion, U.S. Department of the Interior, pp. 284 to 289.

*Membrane pairing.*—In order to practice the present invention successfully an ion selective membrane is chosen having a selectivity greater than that of the filter membrane. The ion selectivity of the latter may be zero.

When immersed in distilled water the ion selective membrane, depending on its composition, exhibits an ion-to-solvent-content ratio of the pore liquid between 1 N and 7 N. The normality of the pore liquid of the filter membrane should therefore be less.

As the ion conductive membranes generally have a pore size of the order of 7 m$\mu$, a filter membrane is chosen which possesses larger pores, the range between 100 and 450 m$\mu$ being preferred. However, a filter membrane of 10 m$\mu$ has proved operative.

Examples

*Example 1.*—A three compartment cell was constructed comprising platinum electrodes and a pair of membranes between the electrodes, the membranes having an exposed area 6 cm. high and 5 cm. wide.

The ion selective membrane was an "Amfion" cation membrane C-103, the filter membrane an S & S "Ultraflex" A coarse membrane. Distance membrane to membrane, and membrane to adjacent electrode: 3 mm. Liquid treated: New York City tap water of a resistivity of 13,000 ohms cm.

The cation membrane had a grid of channels impressed in the surface forming 6 mm. squares, each channel being about 0.2 mm. deep and about 0.4 mm. wide. The contoured surface faced the filter membrane.

RESULTS

| (A) Hydrostatic pressure on both membranes 50 cm. water column flexing the membranes towards each other. | | | |
|---|---|---|---|
| Current (mA) | Potential (V) | Product flow rate, cc./min. | Product resistivity (Ohms cm.) |
| 0 | 0 | 11.4 | (¹) |
| 20 | 12.5 | 12.5 | 42,000 |
| 45 | 25 | 18.5 | 250,000 |
| 60 | 50 | 25.5 | 800,000 |
| (B) Comparison test. Hydrostatic pressure 3 mm. water column. | | | |
| 10 | 12.5 | 2.0 | 700,000 |
| 15 | 25 | 3.0 | 950,000 |
| 25 | 50 | 5.1 | 1,150,000 |

¹ Not measured.

After the test series A the hydrostatic pressure was reduced towards zero while observing the membranes to make certain that the membrane positions remained unchanged. About 3 mm. water column was maintained during test series B. At less than 3 mm. water column pressure the membranes appeared to move apart.

Comment: Application of 50 cm. of water column pressure resulted in a current increase by 2.4 and a product volume increase by 5. Further, the application of progressively higher potentials resulted not only in higher volumetric output but also in higher deionization.

*Example 2.*—In the three compartment cell of Example 1 the filter membrane was replaced by an S & S "Ultraflex" medium membrane.

Liquid treated: NaCl in water solution of 220 ohms cm. resistivity. The hydrostatic pressure in the electrode compartments exceeded the pressure in the product compartment by 3 cm. water column.

RESULTS

| Current (mA) | Potential (V) | Product flow rate, cc./min. | Product resistivity (Ohms cm.) |
|---|---|---|---|
| 100 | 7.8 | 0.8 | 12,200 |
| 220 | 17.5 | 1.4 | 31,800 |

*Example 3.*—Three compartment cell as in Example 1 with S & S "Ultraflex" A coarse filter membrane and "Nepton" anion AR–111–A membrane which is a rigid membrane. Pressure in both electrode chambers higher than in product chambers by 3 cm. water column. Liquid treated: New York City tap water of a resistivity of 13,000 ohms cm. Potential 34 v.

Result: 20 mA, 3.7 cc./min., 430,000 ohms cm.

*Example 4.*—Three compartment cell as in Example 1 with S & S "Ultraflex" A coarse membrane, "Amfion" cation C–60 membrane, smooth on both sides, and a Saran net type spacer of 0.3 mm. thickness and 6 mm. mesh size between the membranes. The Saran mesh was stretched taut in a frame. Liquid treated: New York City tap water of a resistivity of 13,000 ohms cm. Potential 56 v. Pressure in both electrode chambers higher than in product chamber by 3 cm. water column.

Result: 20 mA, 4.4 cc./min., 725,000 ohms cm.

*Example 5.*—Conducted to determine degree of membrane fouling under severe conditions. Cell of Example 1 with an S & S "Ultraflex" type 0 filter membrane and an "Amfion" cation membrane C–103 contoured as in Example 1. Liquid treated: dishwater to which was added soap, milk, red wine, Bentonite, gelatine, coffee, pepper, NaCl, MgCl, resistivity 580 ohms cm.

Result: 129 mA, 1.6 cc./min., 16,400 ohms cm.

The product liquid was clear liquid free from Bentonite and the organic coloring matter of the raw liquid.

After the test the current was shut off and a hydrostatic pressure increased from 3 to 40 cm. water column and maintained for 12 hours. At the beginning of the 12 hour period the liquid flow rate through the membranes into the product compartment was 0.4 cc./min., at the end 0.19 cc./min., indicating partial clogging of the filter membrane.

The pressure of 3 cm. water column was then restored and the test resumed.

Result: 129 mA, 1.5 cc./min., 18,200 ohms cm.

The current was then reversed for 5 minutes at 250 mA and the first test of this series repeated.

Result: 129 mA, 1.6 cc./min., 16,700 ohms cm.

Comment: During normal operation the membranes do not appear to clog materially, and that a somewhat intensified degree of clogging produced by hydrostatic overpressure can be substantially removed by reversal of the direction of the current.

*Example 6.*—Three compartment cell as in Example 1 with "Amfion" cation membrane with contoured grid surface as in Example 1. Filter membrane prepared from an "Amfion" cation C–103 membrane with smooth surfaces as follows: The membrane material was swelled at 350° F. in a liquid mixture. The mixture was composed of 7 parts of an aqueous solution of 1 N potassium carbonate and 3 parts butanol. Sufficient pressure was maintained to prevent boiling. Time of treatment: 2 hours followed by washing of the membrane in water. The treatment reduced the ion-to-water-content ratio of the pore liquid to less than one-half by swelling of the pores.

Liquid treated: sea water of resistivity of 29 ohms cm.
Result: 400 mA, 0.2 cc./min., 1,490 ohms cm.
Pressure head: 15 cm. water column.
The product was potable water.

*Example 7.*—Three compartment cell as in Example 1, with "Amfion" cation membrane C–103 with a contoured grid surface. Filter membrane: Graver "Hisep" membrane. Liquid treated: $Na_2SO_4$ in water of 250 ohms cm. resistivity.

Result: 400 mA, 1.2 cc./min., 30,000 ohms cm.

*Example 8.*—Three compartment cell as in Example 1, with "Amfion" anion A–60 membrane. Filter membrane S & S "Ultraflex" A dense.

Liquid treated: New York City water of a resistivity of 13,000 ohms cm.

RESULTS

| (A) Pressure head zero | | | |
|---|---|---|---|
| Current (mA) | Potential (V) | Product flow rate, cc./min. | Product resistivity (Ohms cm.) |
| 16 | 25 | 2.5 | 450,000 |
| 30 | 50 | 5.0 | 800,000 |
| 40 | 75 | 6.8 | 1,100,000 |
| 50 | 100 | 7.5 | 1,200,000 |
| (B) Pressure head 50 cm. water column | | | |
| 0 | 0 | 1.4 | ---------- |
| 60 | 75 | 13.4 | 900,000 |

The product liquid was evaporated and showed a smaller relatively insoluble residue, probably silica, than liquid produced by a cation membrane.

*Example 9.*—Apparatus of the construction shown in FIG. 10 with four cation membranes and three filter membranes mounted in membrane frames of 3 mm. thickness leaving exposed a membrane area of 5 cm. in width and 6 cm. in height.

Cation membranes: "Amfion" C–103 membranes with grid contour on both sides, as in Example 1. The membranes were shrunk taut on the frames as follows: The membrane sheets were immersed in aqueous 2 N HCl solution for 15 minutes, washed in distilled water and stretched taut over the frames by folding the membrane margin over the outer frame edges and clamping the margin to the frame. Subsequent immersion in 0.1 N aqueous NaCl solution causes the membranes to shrink slightly, increasing their tension.

The filter membranes were S & S "Ultraflex" A medium membranes mechanically fastened to their frames in the same manner.

Hydrostatic pressure in the raw liquid chambers 4 cm. water column higher than in the product chambers, thereby flexing the membrane pairs as shown in FIG. 10.

Liquid treated: Natural muddy saline water from marshy land near the Pacific Ocean of a resistivity of 265 ohms cm.

Result: 390 mA, 6.3 cc./min., 76,000 ohms cm.

After 60 minutes the product flow had fallen to 5.1 cc./min. suggesting partial clogging of the membranes. Some electrode scale was observed on the platinum electrodes.

The current was reversed and the pressure in the product chambers raised to 10 cm. water column over the raw liquid chambers. Time of reversal operation: 2 minutes.

Normal operation was then resumed. After 5 minutes of normal operation the result was as follows: 390 mA, 6.35 cc./min., 76,000 ohms cm.

After 60 minutes of operation the result was as follows: 390 mA, 5.0 cc./min., 94,000 ohms cm.

*Example 10.*—The apparatus of Example 9 was operated for 2 hours leading to a reduction in the product flow rate to 4.9 cc./min.

The polarity was then reversed and the flow through the chambers interchanged in such a way that raw liquid was passed through the previous product chambers and product was withdrawn from the previous raw liquid chambers. The hydrostatic pressure in the respective raw liquid chambers was maintained 4 cm. water column higher than in the product chambers.

Result: (Reading taken 10 minutes after each reversal.)

390 mA, 6.2 cc./min., 78,500 ohms cm. after two hours: 390 mA, 4.9 cc./min., 95,000 ohms cm.

*Example 11.*—Apparatus as in Example 10 except that the cation membranes were not contoured but smooth. Liquid as in Example 10.

Result: 360 mA, 6.4 cc./min., 73,400 ohms cm.

*Example 12.*—Apparatus as in Example 10 except that Saran screen spacers of 0.3 mm. thickness and 6 mm. mesh size were mounted, stretched in frames, between successive membranes. The membranes were secured to, but not stretched right over, their respective frames, permitting the membranes to flex freely. The "Amfion" cation had smooth surfaces.

Result: 360 mA, 6.6 cc./min., 67,000 ohms cm.

What is claimed is:

1. The process of extracting solvent from an ionic solution in which the solvent is present in excess of the solvent of solvation by the action of an electric current passing through the solution in a membrane cell, comprising, between spaced electrodes, a first and a second membrane, the process comprising the steps of applying a direct electrical potential to said electrodes to drive ions of one polarity of the solution by the resulting electric current from a first chamber through the first membrane into a second chamber; driving said ions by said electric current from said second chamber through the second membrane into a further chamber containing an electrolyte liquid, the second membrane being selectively permeable to ions of said one polarity and passage resistant to ions of the opposite polarity, the first membrane being of larger effective pore size than the second membrane to pass ions of said one polarity in a more highly solvated state from said first chamber into said second chamber than the state of the ions of said one polarity which pass from said second chamber into said further chamber; maintaining a higher hydrostatic pressure in said first chamber than in said second chamber; maintaining the potential sufficiently high to prevent passage of substantially all the ions of the opposite polarity from the first chamber into the second chamber; and withdrawing solvent component liquid from said second chamber.

2. The process of extracting solvent from an ionic solution in which the solvent is present in excess of the solvent of solvation in a cell comprising, between spaced electrodes, at least three chambers separated from one another by two membranes, the first membrane separating a first chamber from a second chamber, the second membrane separating the second chamber from a further chamber, the first membrane being selectively permeable to ions of one polarity and passage resistant to ions of the opposite polarity and containing a pore liquid of a certain ions-of-one-polarity-to-solvent-content ratio, the second membrane being selectively permeable to ions of one polarity and passage resistant to ions of the opposite polarity and containing a pore liquid of a higher ions-of-said-one-polarity-to-solvent-content ratio than said first membrane, said first and said further chambers containing volumes of ionic liquid, the process comprising, passing an electric direct current through said chambers and membranes to drive ions of said one polarity of the solution in the first chamber into the second chamber and thence into said further chamber; maintaining a higher hydrostatic pressure in said first chamber than in said second chamber; maintaining the potential sufficiently high to prevent passage of substantially all the ions of the opposite polarity from the first chamber into the second chamber; and withdrawing from said first chamber solvent transferred into it from said first chamber by the ions of said one polarity at a faster rate than it is removed from said second chamber into said further chamber by said last named ions.

3. The process of desalting an aqueous saline solution in which the water is present in excess of the water of hydration in an electrodialysis cell comprising, between two spaced electrodes, a pair of membranes of which the first membrane is a filter membrane of a certain pore size and of which the second membrane is a selectively permeable membrane having a smaller effective pore size for passage of ions of a certain polarity to which said second membrane is preferentially permeable than the pore size of said first membrane, said second membrane being passage resistant to ions of the opposite polarity, said membranes subdividing the space between the electrodes into at least three liquid spaces, the process comprising, supplying the solution to be desalted into the first space; maintaining a hydraulic pressure differential across said first membrane such as to maintain a higher pressure in said first space than in said second space; applying a direct electrical potential to the electrodes to drive by the resultant electric current ions of said certain polarity and water from the first space through the first membrane into the second space and to drive the ions from the second space through the second membrane into the third space; maintaining the said potential sufficiently high to prevent passage of substantially all of the ions of the opposite polarity from the first space into the second space; and withdrawing from the second space deionized water accumulating therein as a result of the difference in water transfer by the driven ions through the two membranes.

4. The process according to claim 3 in which the said second membrane is a cation membrane, and in which the driven ions are cations.

5. The process according to claim 3 in which the said second membrane is an anion membrane, and in which the driven ions are anions.

6. The process of desalting an aqueous saline solution in which the water is present in excess of the water of hydration in an electrodialysis cell comprising, between two spaced electrodes, a pair of membranes of which the first membrane is a filter membrane of a certain pore size and of which the second membrane is a selectively permeable membrane having a smaller effective port size for passage of ions of a certain polarity into which said second membrane is preferentially permeable than the pore size of said first membrane, said second membrane being passage resistant to ions of the opposite polarity, said membranes subdividing the space between the electrodes into at least three liquid spaces, the process comprising, supplying the solution to be desalted into the first space; maintaining a hydraulic pressure differential across said first membrane such as to maintain a higher pressure in said first space than in said second space; applying a direct electrical potential to the electrodes to drive by the resultant electric current ions of said certain polarity and water from the first space through the first membrane into the second space and to drive the ions from the second space through the second membrane into the third space; urging the membranes toward a position of physical contact with each other within the second space; maintaining the said potential sufficiently high to prevent passage of substantially all of the ions of the opposite polarity from the first space into the second space; and withdrawing from the second space deionized water accumulating therein as a result of the difference in water transfer by the driven ions through the two membranes.

7. The process according to claim 6 in which a higher hydrostatic pressure is maintained in the third space than in the second space so as to flex the second membrane towards the first membrane.

8. The process of desalting an aqueous saline solution in which the water is present in excess of the water of hydration in a multichamber cell comprising, between two spaced electrodes, a plurality of membrane pairs of which the first membrane is a filter membrane of a certain pore size and of which the second membrane is a selectively permeable membrane having a smaller effective pore size for ions of a certain polarity to which said second membrane is preferentially permeable than the pore size of said first membrane, said second membrane being passage resistant to ions of the opposite polarity, said membrane pairs subdividing the space between the electrodes into product chambers between the membranes of each pair and influent chambers between successive pairs of membranes, the process comprising, supplying solution to be desalted into said influent chambers; maintaining a higher hydrostatic pressure in said influent chambers than in said product chambers; applying a direct electrical potential to the electrodes to drive by the resultant electric current ions of said certain polarity and water from said influent chambers through a first membrane of a pair into a product chamber and to drive the said ions from the product chamber through the second membrane of the pair into the next influent chamber; maintaining the said potential sufficiently high to prevent passage of substantially all of the ions of the opposite polarity through said first membrane into the second space; and withdrawing from the product chambers deionized water accumulating therein as a result of the difference in water transfer by the driven ions through the two membranes of each pair.

9. Multichamber apparatus for extracting solvent from an ionic solution by the action of an electric current, the apparatus comprising, in combination, a pair of spaced electrodes; a plurality of membranes of two types arranged in alternate sequence between said electrodes to form alternating raw liquid and solvent product chambers between the electrodes, the membranes of one type being selectively permeable to ions of one polarity and passage resistant to ions of the opposite polarity, the membranes of the other type being permeable to ions of said one polarity, and having in its pores a higher solvent content in relation to the number of contained ions of said one polarity than said selectively permeable membranes, as a result of which a greater volume of solvent is moved into the product chambers by ions of said one polarity than the volume of solvent passing out of the product chamber with the said ions of said one polarity; duct means for flowing raw liquid through said raw liquid chambers in a direction substantially parallel to the membranes; duct means for withdrawing solvent product liquid from said product chambers; and means for maintaining a higher hydrostatic pressure in said raw liquid chambers than in said product chambers.

10. Multichamber apparatus for extracting solvent from an ionic solution by the action of an electric current, the apparatus comprising, in combination, a pair of spaced electrodes; a stack of membranes of two types arranged in alternating sequence between said electrodes to form alternating raw liquid and solvent product chambers between the electrodes, the membranes of one type being selectively permeable to ions of one polarity and passage resistant to ions of the opposite polarity, the membranes of the other type being permeable to ions of said one polarity, and having in its pores a higher solvent content in relation to the number of contained ions of said one polarity than said selectively permeable membranes, said membranes being arranged in pairs, a pair comprising a membrane of one type and a membrane of the other type; peripheral spacer elements between membranes of successive pairs defining peripheral chambers with the bordering membranes of successive pairs; internal spacer elements between the membranes of a pair defining internal chambers, said peripheral elements being stacked with the membranes to constitute a peripheral stack, said internal spacers being aligned and forming at least one internal stack; first duct means extending through the peripheral stack and communicating with the peripheral chambers; and second duct means extending through the internal stack and communicating with the internal chamber.

11. Multichamber apparatus for extracting solvent from an ionic solution by the action of an electric current, the apparatus comprising, in combination, a pair of spaced electrodes; a stack of membranes of two types arranged in alternating sequence between said electrodes to form alternating raw liquid and solvent product chambers between the electrodes, the membranes of one type being selectively permeable to ions of one polarity and passage resistant to ions of the opposite polarity, the membranes of the other type being permeable to ions of said one polarity, and having in its pores a higher solvent content in relation to the number of contained ions of said one polarity than said selectively permeable membranes, said membranes being arranged in pairs, a pair comprising a membrane of one type and a membrane of the other type; peripheral spacer elements between membranes of successive pairs defining peripheral raw liquid chambers with the bordering membranes of successive pairs; internal spacer elements between the membranes of each pair defining internal solvent product chambers, said peripheral elements being stacked with the membranes to constitute a peripheral stack, said internal spacers being aligned and forming an internal stack; inflow duct means extending through the peripheral stack; outflow duct means extending through the peripheral stack, said inflow and outflow duct means communicating with said peripheral chambers to pass raw liquid therethrough; and product outflow duct means extending through said internal stack and communicating with said internal chambers to withdraw solvent product therefrom.

12. Multichamber apparatus for extracting solvent from an ionic solution by the action of an electric current, the apparatus comprising, in combination, a pair of spaced electrodes; a stack of membranes of two types arranged in alternating sequence between said electrodes, the membranes of one type being selectively permeable to ions of one polarity and passage resistant to ions of the opposite polarity; the membranes of the other type being permeable to ions of said one polarity and having in its pores a higher solvent content in relation to the number of ions of said one polarity than said selectively permeable membranes, as a result of which a greater volume of solvent is moved into certain chambers by ions of said one polarity than the volume of solvent moved out of said certain chambers by the ions of said one polarity traversing the stack; said membranes being arranged in pairs, a pair comprising a membrane of one type and a membrane of the other type; first spacer elements between the membranes which constitute a pair, said first spacer elements being aligned with one another and representing a first spacer stack extending through the membrane stack; second spacer elements between the membranes of consecutive pairs, said second spacer elements being aligned with one another and representing a second spacer stack extending through the membrane stack; said second spacer stack being spaced from said first spacer stack, the spaces formed by the spacers of each spacer stack and the respective membranes spaced thereby constituting fluid chambers, the fluid chambers of the one spacer stack alternating with the fluid chambers of the other spacer stack; duct means for passing raw liquid through the fluid chambers of the one stack; and duct means for withdrawing solvent product liquid from the fluid chambers of the other stack.

13. Multichamber apparatus for extracting solvent from an ionic solution by the action of an electric current, the apparatus comprising, in combination, a pair of spaced electrodes; a stack of membranes of two types arranged in alternating sequence between said electrodes to form alternating raw liquid and solvent product chambers between the electrodes, the membranes of one type being selectively permeable to ions of one polarity and passage resistant to ions of the opposite polarity, the membranes of the other type being permeable to ions of said one polarity, and having in its pores a higher solvent content in relation to the number of contained ions of said one polarity than said selectively permeable membranes, said membranes being arranged in pairs, a pair comprising a membrane of one type and a membrane of the other type, the membranes of a pair being at least partially in face to face contact, at least one of the contacting membrane surfaces being contoured to provide elevated surface portions for contact and recessed surface portions to provide liquid channels between the contacting membranes; peripheral spacer elements between membranes of successive pairs and forming peripheral raw liquid chambers; internal spacer elements between membranes of a pair defining internal chambers, said internal spacers being aligned and forming at least one internal spacer stack within the membrane stack; duct means for passing raw liquid into and out of the peripheral chambers; and duct means extending through an internal spacer stack and communicating with said internal chambers for withdrawing solvent product therefrom.

14. Multichamber apparatus for extracting solvent from an ionic solution by the action of an electric current, the apparatus comprising, in combination, a pair of spaced electrodes; a stack of membranes of two types arranged in alternating sequence between said electrodes to form alternating raw liquid and solvent product chambers between the electrodes, the membranes of one type being selectively permeable to ions of one polarity and passage resistant to ions of the opposite polarity, the membranes of the other type being permeable to ions of said one polarity, and having in its pores a higher solvent content in relation to the number of contained ions of said one polarity than said selectively permeable membranes, as a result of which a greater volume of solvent is moved into the product chambers by ions of said one polarity than the volume of solvent passing out of the product chamber with the said ions of said one polarity, the membranes of one type being in surface-to-surface contact with the membranes of the other type within the product chambers; duct means for flowing raw liquid through said raw liquid chambers; duct means for withdrawing solvent product liquid from said product chambers; and means for maintaining a higher hydrostatic pressure in said raw liquid chambers than in said product chambers.

15. Multichamber apparatus for extracting solvent from an ionic solution by the action of an electric current, the apparatus comprising, in combination, a pair of spaced electrodes; a stack of membranes of two types arranged in alternating sequence between the electrodes to form two kinds of liquid chambers, more particularly raw liquid chambers and solvent product chambers arranged in alternating sequence between the electrodes, the membranes of one type being selectively permeable to ions of one polarity and passage resistant to ions of the opposite polarity, the membranes of the other type being permeable to ions of said one polarity, and having in its pores a higher solvent content in relation to the number of contained ions of said one polarity than said selectively permeable membranes, as a result of which a greater volume of solvent in relation to the number of ions of said one polarity move through the membranes of one type than through the membranes of the other type; first duct means leading to the liquid chambers of one kind; second duct means leading to the liquid chambers of the other kind; and means for maintaining a higher hydrostatic pressure in the liquid chambers of one kind to deflect the membranes into a position of closer spacing within the chambers of the other kind, than the spacing within the chambers of the one kind.

16. Multichamber apparatus for extracting solvent from an ionic solution by the action of an electric current, the apparatus comprising, in combination, a pair of spaced electrodes; a stack of membranes of two types arranged in alternating sequence between the electrodes to form two kinds of liquid chambers, more particularly raw liquid chambers and solvent product chambers arranged in alternating sequence between the electrodes, the membranes of one type being selectively permeable to ions of one polarity and passage resistant to ions of the opposite polarity, the membranes of the other type being permeable to ions of said one polarity, and having in its pores a higher solvent content in relation to the number of contained ions of said one polarity than said selectively permeable membranes, as a result of which a greater volume of solvent in relation to the number of ions of said one polarity move through the membranes of one type than through the membranes of the other type; first duct means leading to the liquid chambers of one kind; second duct means leading to the liquid chambers of the other kind; means for maintaining a higher hydrostatic pressure in the liquid chambers of one kind to deflect the membranes into surface-to-surface position within the chambers of the other kind, and means at least within the last named chambers for spacing the membranes to provide solvent product outflow channels between the membranes to said second duct means.

17. Multichamber apparatus for extracting solvent from an ionic solution by the action of an electric current, the apparatus comprising, in combination, a pair of spaced electrodes; a stack of membranes of two types arranged in alternating sequence between the electrodes to form two kinds of liquid chambers, more particularly raw liquid chambers and solvent product chambers, arranged in alternating sequence between the electrodes, the membranes of one type being selectively permeable to ions of one polarity and passage resistant to ions of the opposite polarity, the membranes of the other type being permeable to ions of said one polarity, and having in its pores a higher solvent content in relation to the number of contained ions of said one polarity than said selectively permeable membranes, as a result of which a greater volume of solvent in relation to the number of ions of said one polarity move through the membranes of one type than through the membranes of the other type; first duct means leading to the liquid chambers of one kind; second duct means leading to the liquid chambers of the other kind; means for maintaining a higher hydrostatic pressure in the liquid chambers of one kind to deflect the membranes into surface-to-surface position within the chambers of the other kind, at least one of the two types of membranes having a contoured surface including projecting surface portions and recessed surface portions, the recessed surface portions forming liquid channels through which liquid may escape from between the contoured membrane and the next membrane lying in surface-to-surface contact with the contoured membrane.

18. Multichamber apparatus for extracting solvent from an ionic solution by the action of an electric current, the apparatus comprising, in combination, a pair of spaced electrodes; a stack of membranes of two types arranged in alternating sequence between the electrodes to form two kinds of liquid chambers, more particularly raw liquid chambers and solvent product chambers arranged in alternating sequence between the electrodes, the membranes of one type being selectively permeable to ions of one polarity and passage resistant to ions of the opposite polarity, the membranes of the other type being permeable to ions of said one polarity, and having in its pores a higher solvent content in relation to the number of contained ions of said one polarity than said selectively permeable membranes, as a result of which a greater volume of solvent in relation to the number of ions of said one polarity move through the membranes of one type than through the membranes of the other type; first duct means leading to the liquid chamber of one kind; second duct means leading to the liquid chambers of the other kind; means for selectively applying a higher hydrostatic pressure in the liquid chambers of one kind and in the liquid chambers of the other kind, respectively, the pressure being sufficient to deflect the membranes into surface-to-surface contact in the respective chambers in which a lesser pressure prevails; and means timed with said selective pressure applying means for reversing the polarity of the electrodes.

References Cited

UNITED STATES PATENTS

| 2,815,320 | 12/1957 | Kollsman | 204—180 |
| 3,017,338 | 1/1962 | Butler et al. | 204—180 |

ROBERT K. MIHALEK, *Primary Examiner.*

E. ZAGARELLA, *Assistant Examiner.*

UNITED STATES PATENT OFFICE

CERTIFICATE OF CORRECTION

Patent No. 3,359,194            December 19, 1967

Paul Kollsman

It is hereby certified that error appears in the above numbered patent requiring correction and that the said Letters Patent should read as corrected below.

Column 12, line 44, for "port" read -- pore --; column 17, line 3, for "and" read -- than --.

Signed and sealed this 29th day of April 1969.

(SEAL)
Attest:

Edward M. Fletcher, Jr.

Attesting Officer

EDWARD J. BRENNER

Commissioner of Patents